US012580445B2

(12) United States Patent
Shinba et al.

(10) Patent No.: US 12,580,445 B2
(45) Date of Patent: Mar. 17, 2026

(54) SUBSTRATE HAVING AT LEAST TWO HOLES FOR INSERTING FIRST TERMINAL OF PAIR OF TERMINALS OF MOTOR

(71) Applicant: KYOCERA Document Solutions Inc., Osaka (JP)

(72) Inventors: Minoru Shinba, Osaka (JP); Masanori Kyogoku, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 202 days.

(21) Appl. No.: 18/545,023

(22) Filed: Dec. 19, 2023

(65) Prior Publication Data

US 2024/0213847 A1 Jun. 27, 2024

(30) Foreign Application Priority Data

Dec. 27, 2022 (JP) ................................. 2022-209599

(51) Int. Cl.
*H02K 5/22* (2006.01)
(52) U.S. Cl.
CPC .................................. *H02K 5/225* (2013.01)
(58) Field of Classification Search
CPC ........ H02K 5/225; H02K 11/33; H05K 1/183; H05K 1/18
USPC .......................................................... 310/71
See application file for complete search history.

(56) References Cited

U.S. PATENT DOCUMENTS

2021/0111608 A1* 4/2021 Hayashi ................ H02M 7/003

FOREIGN PATENT DOCUMENTS

JP       H0951152 A      2/1997
WO     WO-2019198564 A1 * 10/2019 ............. H02K 37/14

OTHER PUBLICATIONS

English Translation of WO2019198564A1 (Year: 2019).*

* cited by examiner

*Primary Examiner* — Terrance L Kenerly
*Assistant Examiner* — Theodore L Perkins
(74) *Attorney, Agent, or Firm* — IP Business Solutions, LLC.

(57) ABSTRACT

A substrate includes a first fixing section and a second fixing section. On the first fixing section, a first terminal of a pair of plate-shaped terminals protruding from a motor is fixed. On the second fixing section, a second terminal of the pair of terminals is fixed. The first fixing section includes a first hole and a second hole. The first hole extends in a second direction, intersecting a first direction extending from the first terminal toward the second terminal. The second hole extends in the second direction, and is located adjacent to the first hole, on an opposite side of the second terminal with respect to the first hole, in the first direction. The first terminal is inserted through one of the first hole and the second hole.

1 Claim, 9 Drawing Sheets

93

94

91

92

D1

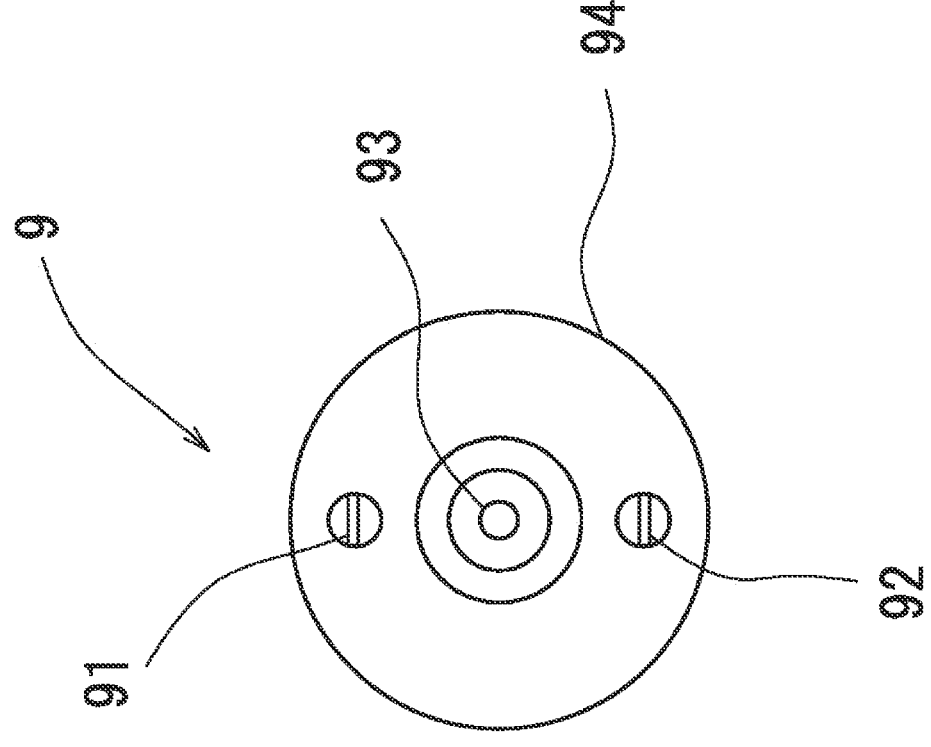
Fig.4
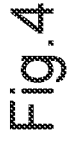
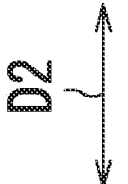

9A

93

94

91A

92A

D1

SUBSTRATE HAVING AT LEAST TWO HOLES FOR INSERTING FIRST TERMINAL OF PAIR OF TERMINALS OF MOTOR

INCORPORATION BY REFERENCE

This application claims priority to Japanese Patent Application No. 2022-209599 filed on Dec. 27, 2022, the entire contents of which are incorporated by reference herein.

BACKGROUND

The present disclosure relates to a substrate.

Many of existing flexible substrates include a first land portion and a second land portion, for fixing thereto an electric component (e.g., a motor). In such a flexible substrate, a cross-shaped slit is formed in each of the first land portion and the second land portion.

SUMMARY

The disclosure proposes further improvement of the foregoing techniques.

In an aspect, the disclosure provides a substrate including a first fixing section and a second fixing section. On the first fixing section, a first terminal of a pair of plate-shaped terminals protruding from a motor is fixed. On the second fixing section, a second terminal of the pair of terminals is fixed. The first fixing section includes a first hole and a second hole. The first hole extends in a second direction, intersecting a first direction extending from the first terminal toward the second terminal. The second hole extends in the second direction, and is located adjacent to the first hole, on an opposite side of the second fixing section in the first direction, with respect to the first hole. The first terminal is inserted through one of the first hole and the second hole.

BRIEF DESCRIPTION OF THE DRAWINGS

FIG. 4 is a rear view of the motor according to the first embodiment:

DETAILED DESCRIPTION

Figure 1:
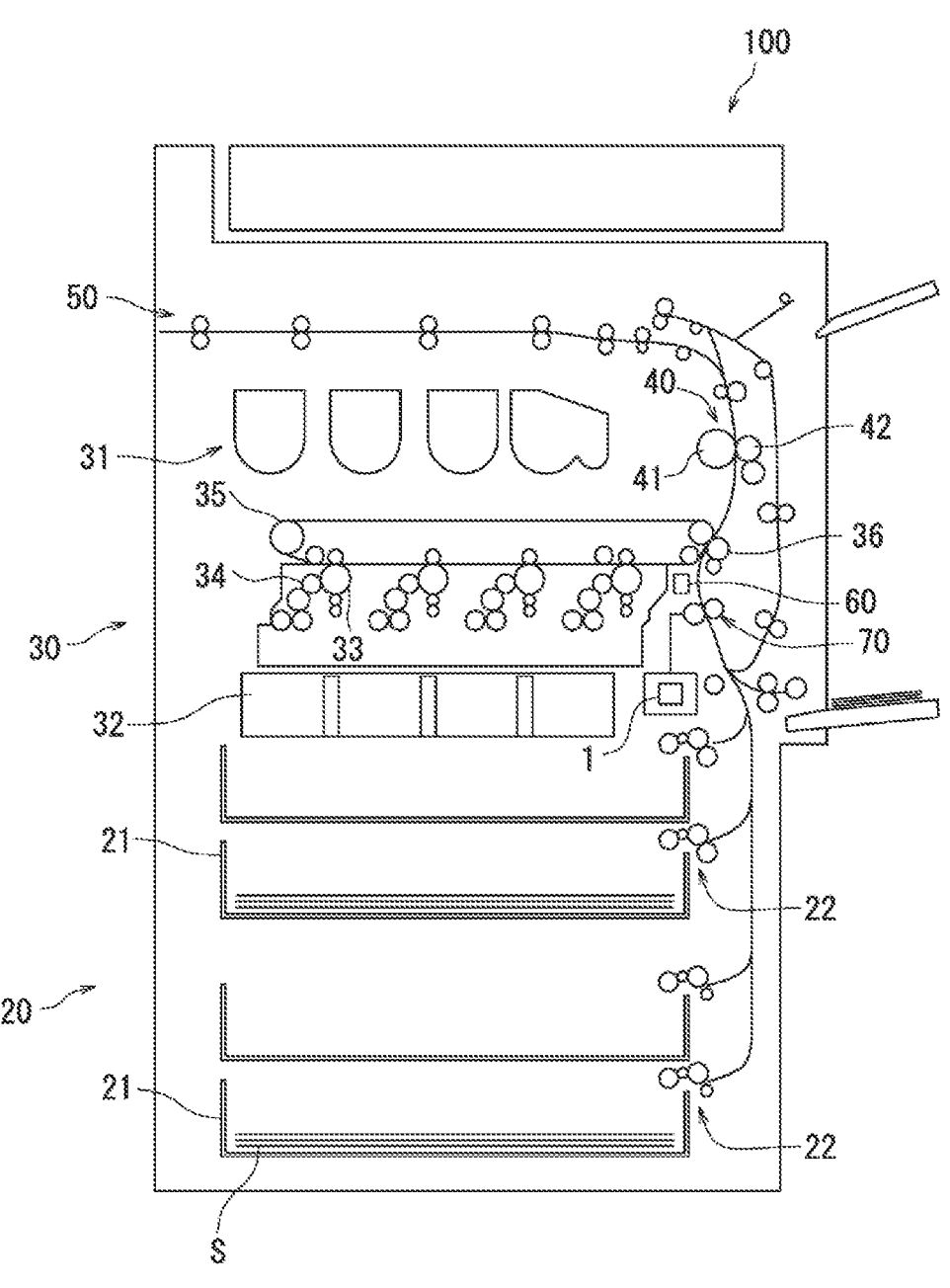
FIG. 1 is a schematic cross-sectional view showing an image forming apparatus according to a first embodiment of the disclosure.

Hereafter, some embodiments of the disclosure will be described, with reference to the drawings. It is to be noted that the disclosure is not limited to the following embodiments. In the drawings, the same or corresponding elements are given the same numeral, and the description of such elements will not be repeated.

First Embodiment

Referring first to FIG. 1, an image forming apparatus including a substrate for a motor will be described hereunder. FIG. 1 illustrates the image forming apparatus 100. As shown in FIG. 1, the image forming apparatus 100 includes a control device 1, a sheet feeding device 20, an image forming device 30, a fixing device 40, a delivery device 50, a sensor 60, and a transport roller 70.

The control device 1 controls the operation of each component of the image forming apparatus 100. The control device 1 includes, for example, a central processing unit (CPU) or a micro processing unit (MPU). The control device 1 also includes a storage device such as a random-access memory (RAM), read-only memory (ROM), and a hard disk drive (HDD). The control device 1 executes a computer program stored in the storage device, to thereby control the operation of each component.

The sheet feeding device 20 serves to feed sheet S toward the image forming device 30, one by one. The sheet feeding device 20 includes one or more sheet cassettes 21 and feed roller sets 22. The sheet cassette 21 is formed so as to accommodate therein a plurality of sheets S. The feed roller set 22 feeds the sheets S in the sheet cassette 21 one by one, to the transport roller 70.

The transport roller 70 serves to transport the sheet S. In the first embodiment, the transport roller 70 transports the sheet S from the sheet feeding device 20 to the image forming device 30. The transport roller 70 according to the first embodiment is a resist roller. The transport roller 70 corrects the skew of the sheet S being transported. At this point, the transport roller 70 temporarily stops the movement of the sheet S. After temporarily stopping the sheet S, the transport roller 70 delivers the sheet S to the image forming device 30, at an appropriate timing for the image forming operation by the image forming device 30.

The image forming device 30 forms an image on the sheet S, delivered by the transport roller 70. The image forming device 30 includes toner suppliers 31, exposure devices 32, photoconductor drums 33, developing rollers 34, an intermediate transfer belt 35, and a transfer roller 36.

The toner suppliers 31 supply toner to the respective developing rollers 34. The exposure device 32 emits a laser beam to the photoconductor drum 33, thereby forming thereon an electrostatic latent image. The developing roller 34 supplies the toner to the photoconductor drum 33, thereby developing the electrostatic latent image. Through such process, an image is formed on the photoconductor drum 33.

The images formed on the respective photoconductor drums 33 are transferred to the intermediate transfer belt 35. The transport roller 70 delivers the sheet S to the transfer roller 36. The transfer roller 36 transfers the image transferred to the intermediate transfer belt 35, to the sheet S. The sheet S having the image formed thereon is transported to the fixing device 40.

The fixing device 40 fixes, onto the sheet S, the image transferred thereto. The fixing device 40 includes a heating device 41 and a pressure device 42. The fixing device 40 heats and presses the sheet S with the heating device 41 and the pressure device 42, thereby fixing the image onto the sheet S. The delivery device 50 delivers the sheet S, having the image fixed thereto, to outside of the apparatus main body.

The sensor 60 is located between the transfer roller 36 and the transport roller 70. The sensor 60 is for detecting the sheet S. The sensor 60 generates a detection signal of the sheet S.

Figure 2:
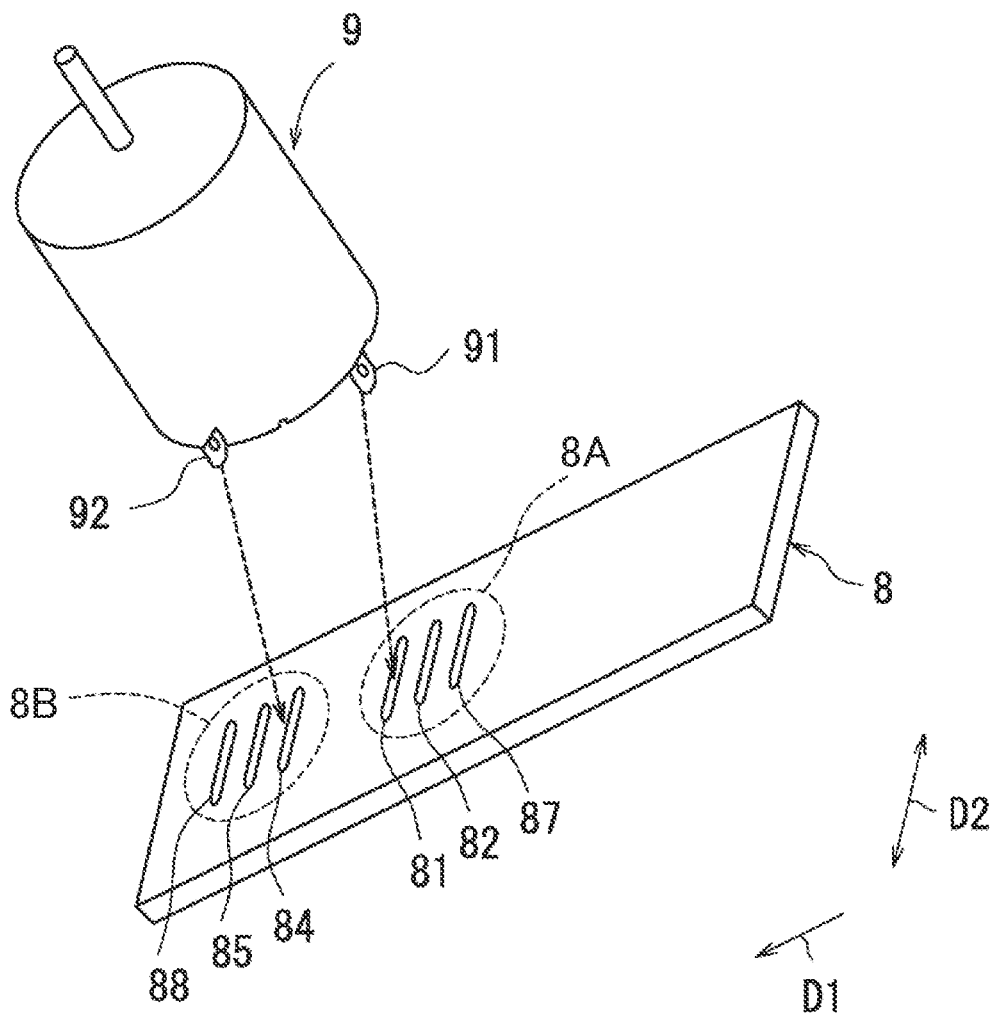
FIG. 2 is an exploded perspective view showing a substrate and a motor, according to the first embodiment.

Referring to FIG. 2, a configuration of a substrate for motor will be described hereunder. FIG. 2 is an exploded perspective view showing a substrate 8 and a motor 9. As shown in FIG. 2, the motor 9 is mounted on the substrate 8.

The motor 9 is a direct-current (DC) motor. A plurality of DC motors are incorporated in the image forming apparatus 100. Examples of the motor 9 include a transport motor for driving the transport roller 70, a stirring motor for driving a stirring screw; and a supply motor for driving a supply screw of the toner supplier 31. As shown in FIG. 2, the motor 9 includes a pair of plate-shaped terminals, namely a first terminal 91 and a second terminal 92, protruding from the motor 9. Hereinafter, the direction from the first terminal 91 toward the second terminal 92, of the motor 9 fixed to the substrate 8, will be defined as a first direction D1. In addition, a direction intersecting the first direction D1 on the substrate 8, will be defined as a second direction D2.

As shown in FIG. 2, the substrate 8 includes a first fixing section 8A and a second fixing section 8B. The first fixing section 8A includes a first hole 81, a second hole 82, and a seventh hole 87. The first hole 81, the second hole 82, and the seventh hole 87 are elongate holes extending in the second direction D2. The second hole 82 is located adjacent to the first hole 81, on the opposite side of the second fixing section 8B with respect to the first hole 81, in the first direction D1. The seventh hole 87 is located adjacent to the second hole 82, on the opposite side of the first hole 81 in the first direction D1. The first hole 81, the second hole 82, and the seventh hole 87 are aligned at regular intervals. The second fixing section 8B is located ahead of the first fixing section 8A, in the first direction D1. The second fixing section 8B includes a fourth hole 84, a fifth hole 85, and an eighth hole 88.

The first terminal 91 protruding from the motor 9 is fixed to the first fixing section 8A. The second terminal 92 is fixed to the second fixing section 8B. The first fixing section 8A includes the first hole 81 and the second hole 82. The first hole 81 extends in the second direction D2. The second hole 82 also extends in the second direction D2, and is located adjacent to the first hole 81, on the opposite side of the second fixing section 8B in the first direction D1. The first terminal 91 is inserted through one of the first hole 81 and the second hole 82. In other words, the first terminal 91 is configured so as to be inserted through either of the first hole 81 and the second hole 82.

When the pitch between the terminals of the motor 9 is the same as the pitch between the first hole 81 and the fourth hole 84, the first terminal 91 is inserted through the first hole 81, and the second terminal 92 is inserted through the fourth hole 84. When the pitch between the terminals of the motor 9 is the same as the pitch between the second hole 82 and the fourth hole 84, the first terminal 91 is inserted through the second hole 82, and the second terminal 92 is inserted through the fourth hole 84. Thus, the substrate 8 can commonly serve as the base for two types of motors 9, which are different in pitch between the terminals.

Figure 3:
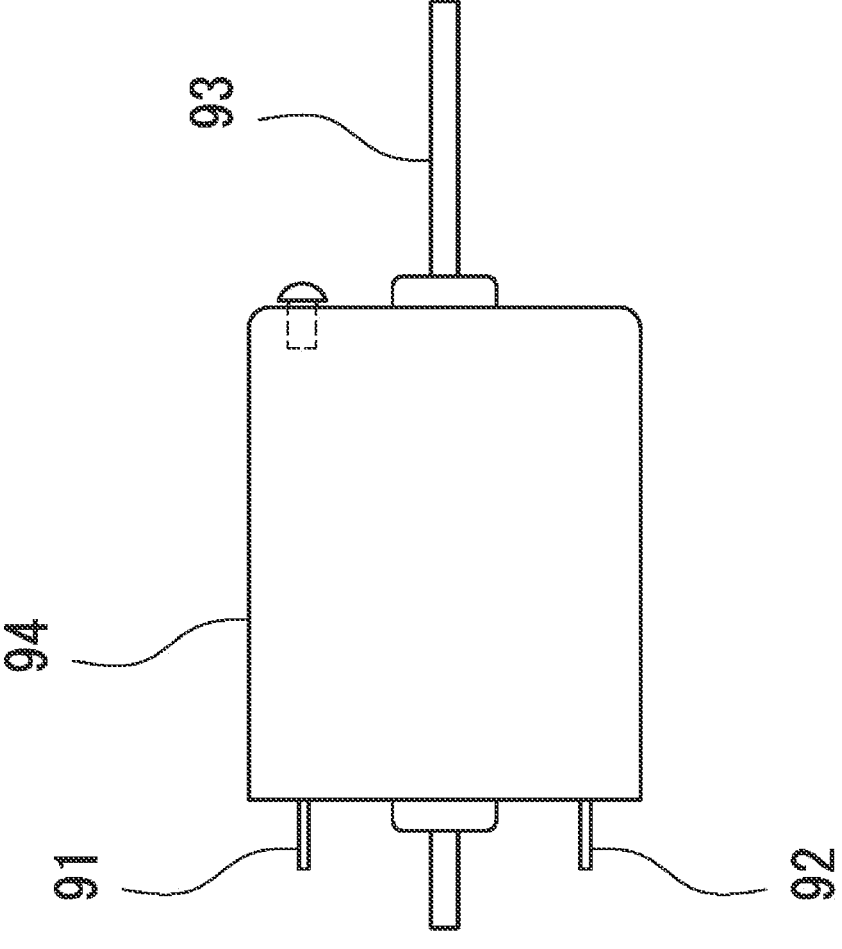
FIG. 3 is a side view of the motor according to the first embodiment.
Figure 5:
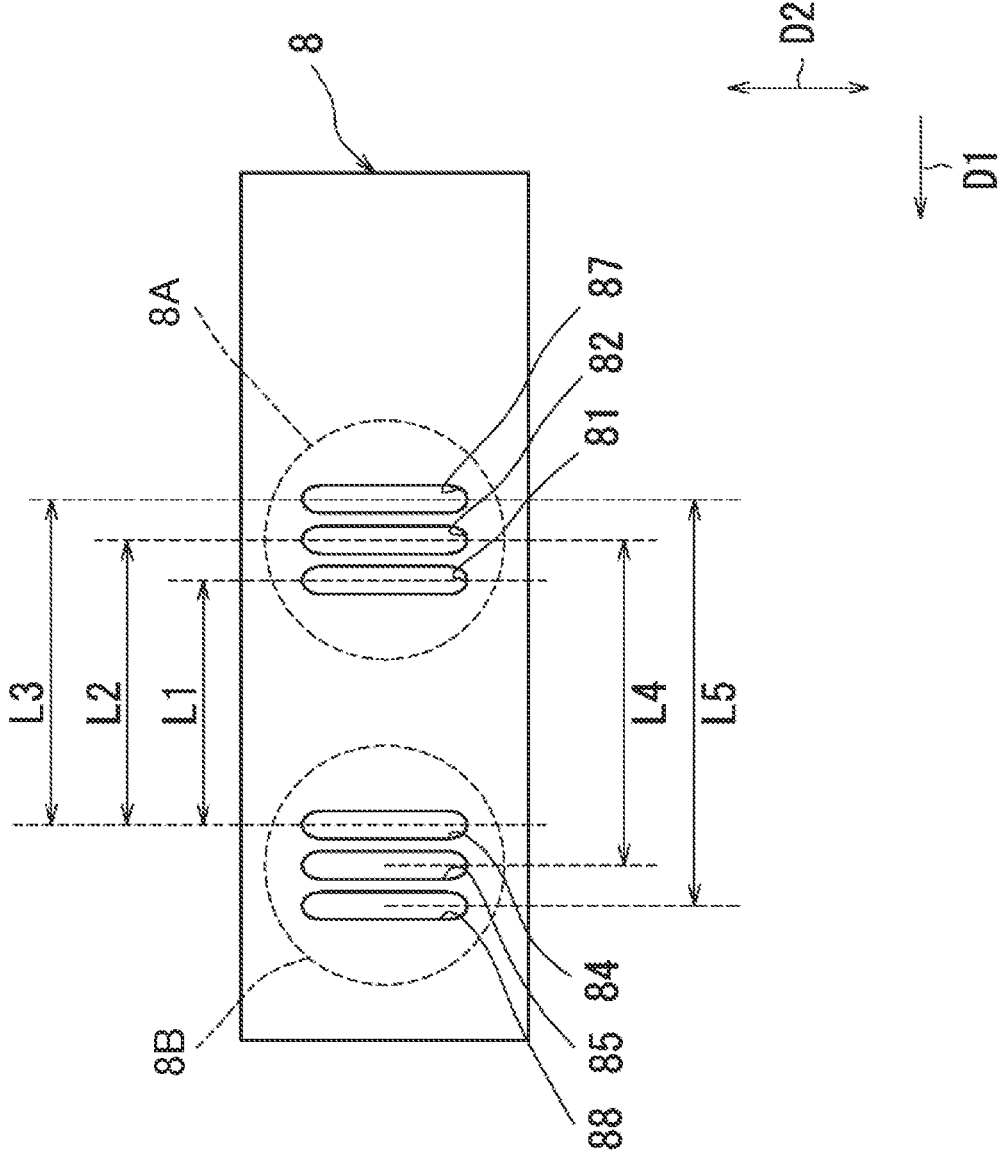
FIG. 5 is a plan view of the substrate according to the first embodiment.

Referring to FIG. 3 to FIG. 5, the configuration of the substrate 8 and the motor 9 will be described in further detail. FIG. 3 is a side view of the motor 9. FIG. 4 is a rear view of the motor 9. FIG. 5 is a plan view of the substrate 8.

As shown in FIG. 3, the motor 9 includes a pair of terminals, namely the first terminal 91 and the second terminal 92, a shaft 93, and a stator 94. The first terminal 91 and the second terminal 92 each supply power to the coil through a brush. The shaft 93 is the rotary shaft of the coil. The shaft 93 extends so as to intersect the second direction D2. The stator 94 includes a field magnet and a yoke, and constitutes the housing of the motor 9.

As shown in FIG. 4, the first terminal 91 and the second terminal 92 are symmetrically positioned, across the shaft 93. The first terminal 91 and the second terminal 92 have the respective inner faces opposed to each other. In other words, the first terminal 91 and the second terminal 92 each include a surface intersecting the first direction D1. The first terminal 91 and the second terminal 92 are equal to each other, in size in the first direction D1 and in size in the second direction D2.

As shown in FIG. 5, the substrate 8 is formed in an elongate shape, longer in the first direction D1 than in the second direction D2. The substrate 8 is, for example, made of a metal material. Therefore, the substrate 8 is lower in elasticity characteristic, compared with a substrate made of a synthetic resin material.

As shown in FIG. 5, the fourth hole 84, the fifth hole 85, and the eighth hole 88 are elongate holes each extending in the second direction D2. The fifth hole 85 is located adjacent to the fourth hole 84, on the opposite side of the first fixing section 8A, in the first direction D1. The eighth hole 88 is located adjacent to the fifth hole 85, on the opposite side of the first fixing section 8A, in the first direction D1. The fourth hole 84, the fifth hole 85, and the eighth hole 88 are aligned at regular intervals. The intervals between the fourth hole 84 and the fifth hole 85, and between the fifth hole 85 and the eighth hole 88, are equal to the intervals between the first hole 81 and the second hole 82, and between the second hole 82 and the seventh hole 87.

When the interval between the fourth hole 84 and the first hole 81 is defined as interval L1, the interval between the fourth hole 84 and the second hole 82 is defined as interval L2, the interval between the fourth hole 84 and the seventh hole 87 is defined as interval L3, the interval between the fifth hole 85 and the second hole 82 is defined as interval L4, and the interval between the eighth hole 88 and the seventh hole 87 is defined as interval L5, the relation among these intervals can be expressed as L1<L2<L3=L4<L5. Therefore, when one of the terminals of the motor 9 is fixed in the fourth hole 84, the substrate 8 allows the motor 9 to be fixed thereto, irrespective of which of the interval L1, the interval L2, and the interval L3, the pitch between the terminals of the motor 9 corresponds to.

In addition, also when the position of the shaft is fixed, the substrate 8 allows the motor 9) to be fixed thereto, irrespective of which of the interval L1, the interval L4, and the interval L5, the pitch between the terminals of the motor 9 corresponds to. When the pitch between the terminals corresponds to the interval between the eighth hole 88 and the first hole 81, the motor 9 can be fixed on the substrate 9, irrespective of which of the first hole 81, the second hole 82, and the seventh hole 87 is selected to fix the first terminal 91. Thus, the fixing position of the motor 9 can be adjusted, in a certain range extending along the first direction D1.

Now; in the case of the mounting structure and mounting method of the existing flexible substrates, a connector pin (terminal) is inserted in the slit. The slit is widened by the connector pin. The slit tentatively fastens the electric component, using the tension generated by being widened. With such a technique, however, when the motors that are different in pitch between the terminals are to be mounted, a single-purpose flexible substrate has to be prepared, for each of the different pitches.

According to the first embodiment, in contrast, the first fixing section 8A includes the first hole 81 extending in the second direction D2, and the second hole 82 extending in the second direction D2, and located adjacent to the first hole 81 on the opposite side of the second fixing section 8B in the first direction D1. The second fixing section 8B includes the fourth hole 84 extending in the second direction D2. Accordingly, the plate-shaped first terminal 91 and second terminal 92, opposed to each other, can be respectively inserted through the first hole 81 and the fourth hole 84, or through the second hole 82 and the fourth hole 84. In other words, the motor 9, having the plate-shaped first terminal 91 and second terminal 92, opposed to each other, can be fixed to the substrate 8. Therefore, the substrate 8 can commonly serve as the base for the motors that are different in pitch between the terminals. Here, the first terminal 91 and the second terminal 92 can be fixed to the substrate 8, by soldering.

The second fixing section 8B also includes the fifth hole 85, extending in the second direction D2 and located adjacent to the fourth hole 84, on the opposite side of the first fixing section 8A in the first direction D1. Therefore, a pair of plate-shaped terminals, opposed to each other with the interval L1 therebetween, can be inserted through the substrate 8, and also a pair of plate-shaped terminals, opposed to each other with the interval L4 therebetween, can be inserted through the substrate 8. In other words, two types of motors, different from each other in pitch between the terminals, can be fixed to the substrate 8, keeping the position of the shaft 93 unchanged. Therefore, the substrate 8 can commonly serve as the base for the motors that are different in pitch between the terminals, without the need to change the position of the shaft 93.

Second Embodiment

Figure 6:
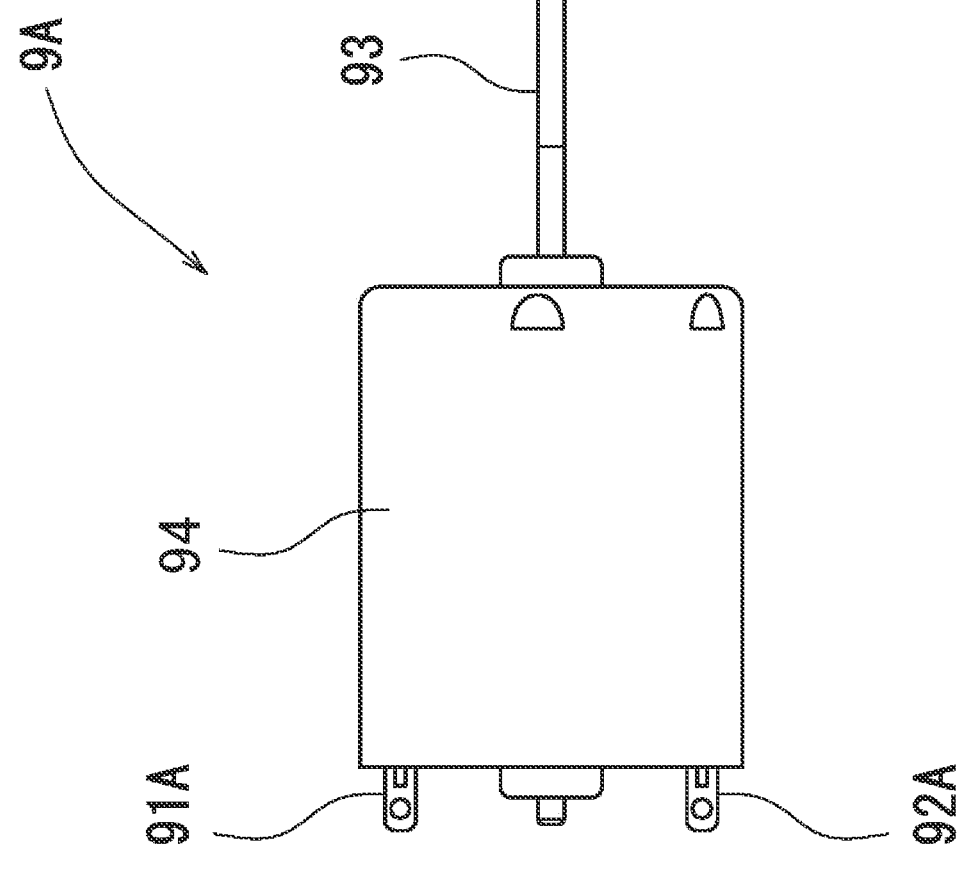
FIG. 6 is a side view of a motor according to a second embodiment of the disclosure.
Figure 6:
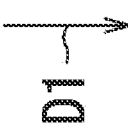
Figure 7:
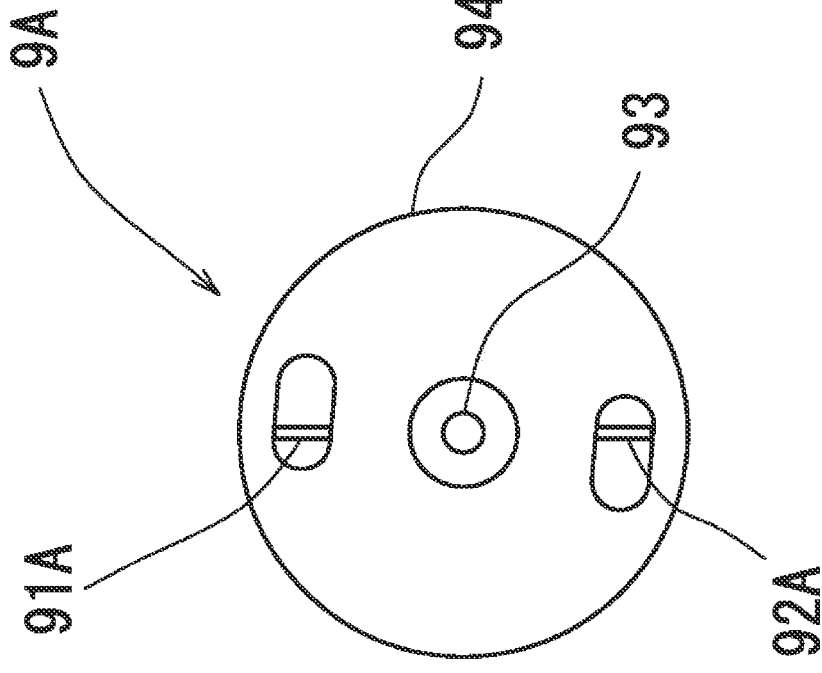
FIG. 7 is a rear view of the motor according to the second embodiment.
Figure 7:
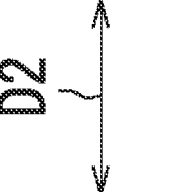
Figure 8:
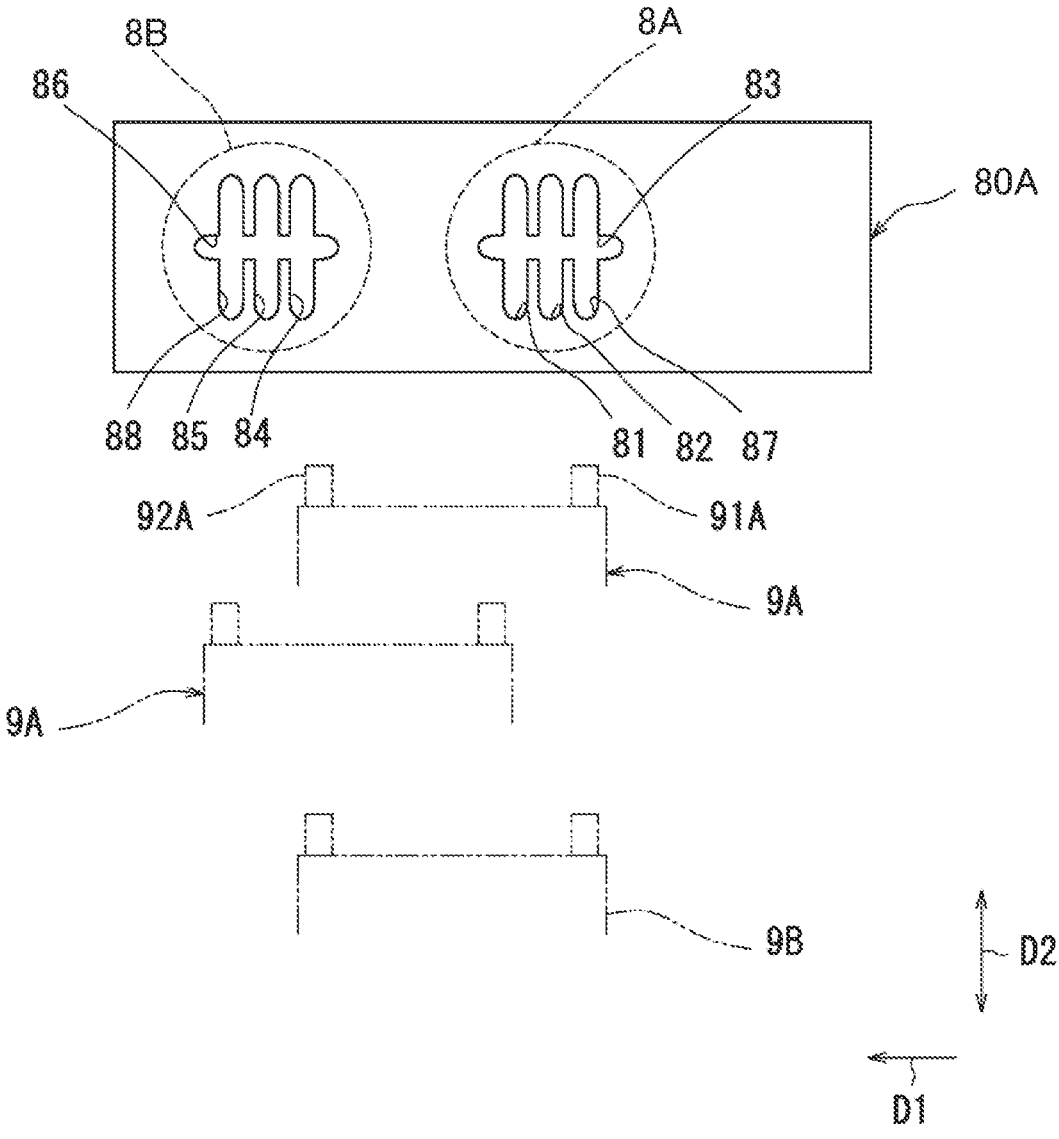
FIG. 8 is a plan view of a substrate according to the second embodiment.

Referring now to FIG. 6 to FIG. 8, a substrate 80A and a motor 9A according to a second embodiment of the disclosure will be described hereunder. FIG. 6 is a side view of the motor 9A. FIG. 7 is a rear view of the motor 9A. FIG. 8 is a plan view of the substrate 80A. The second embodiment is different from the first embodiment, mainly in the configuration of the pair of terminals, namely a first terminal 91A and a second terminal 92A, and in that a third hole 83 and a sixth hole 86 are provided. Hereunder, only such differences from the first embodiment will be described, and the description of similar aspects will not be repeated.

As shown in FIG. 6, the motor 9A includes the first terminal 91A, the second terminal 92A, the shaft 93, and the stator 94.

As shown in FIG. 7, the first terminal 91A and the second terminal 92A are symmetrically located across the shaft 93. The first terminal 91A and the second terminal 92A are coplanar with each other. The first terminal 91A and the second terminal 92A each include a surface intersecting the second direction D2. In other words, the surfaces of the first terminal 91A and the second terminal 92A extend in the first direction D1.

As shown in FIG. 8, the substrate 80A is formed in an elongate shape, longer in the first direction D1 than in the second direction D2. The third hole 83 is an elongate hole extending in the first direction D1. The third hole 83 intersects the first hole 81, the second hole 82, and the seventh hole 87. The sixth hole 86 is an elongate hole extending in the first direction D1. The sixth hole 86 intersects the fourth hole 84, the fifth hole 85, and the eighth hole 88. The third hole 83 and the sixth hole 86 are colinear with each other.

The first terminal 91A is inserted through the third hole 83. The second terminal 92A is inserted through the sixth hole 86. The first terminal 91A and the second terminal 92A are fixed to the substrate 80A, by soldering.

As described above, the first fixing section 8A includes the third hole 83 extending in the first direction D1. Therefore, the plate-shaped first terminal 91A, extending in the first direction D1, can be inserted through the first fixing section 8A. In other words, the motor 9A, having the terminal different in posture from that of the motor 9, can be fixed to the substrate 80A. Consequently; the substrate 80A can commonly serve as the base for different types of motors.

The second fixing section 8B includes the sixth hole 86 extending in the first direction D1. Accordingly, the plate-shaped second terminal 92A extending in the first direction D1 can be inserted through the second fixing section 8B. Therefore, the third hole 83 and the sixth hole 86 of the substrate 80A enable not only the motor 9A, but also a motor 9B, larger in pitch between the terminals than the motor 9A, to be fixed to the substrate 80A. In other words, the motors different in pitch between the terminals from each other can be fixed to the substrate 80A. Further, when the motors 9A to be mounted have the same pitch between the terminals, the fixing position of the motor 9A can be adjusted, in a certain range extending along the first direction D1.

The embodiments of the disclosure have been described as above, with reference to the drawings. However, the disclosure is not limited to the foregoing embodiments, but may be modified in various manners, without departing from the scope of the disclosure. The drawings each schematically illustrate the elements for the sake of clarity, and the thickness, length, number of pieces, and interval of the illustrated elements may be different from the actual ones, because of the convenience in making up the drawings. Further, the material, shape, and size of the elements referred to in the foregoing embodiment are merely exemplary and not specifically limited, and may be modified as desired, without substantially departing from the configuration according to the disclosure.

Figure 9:
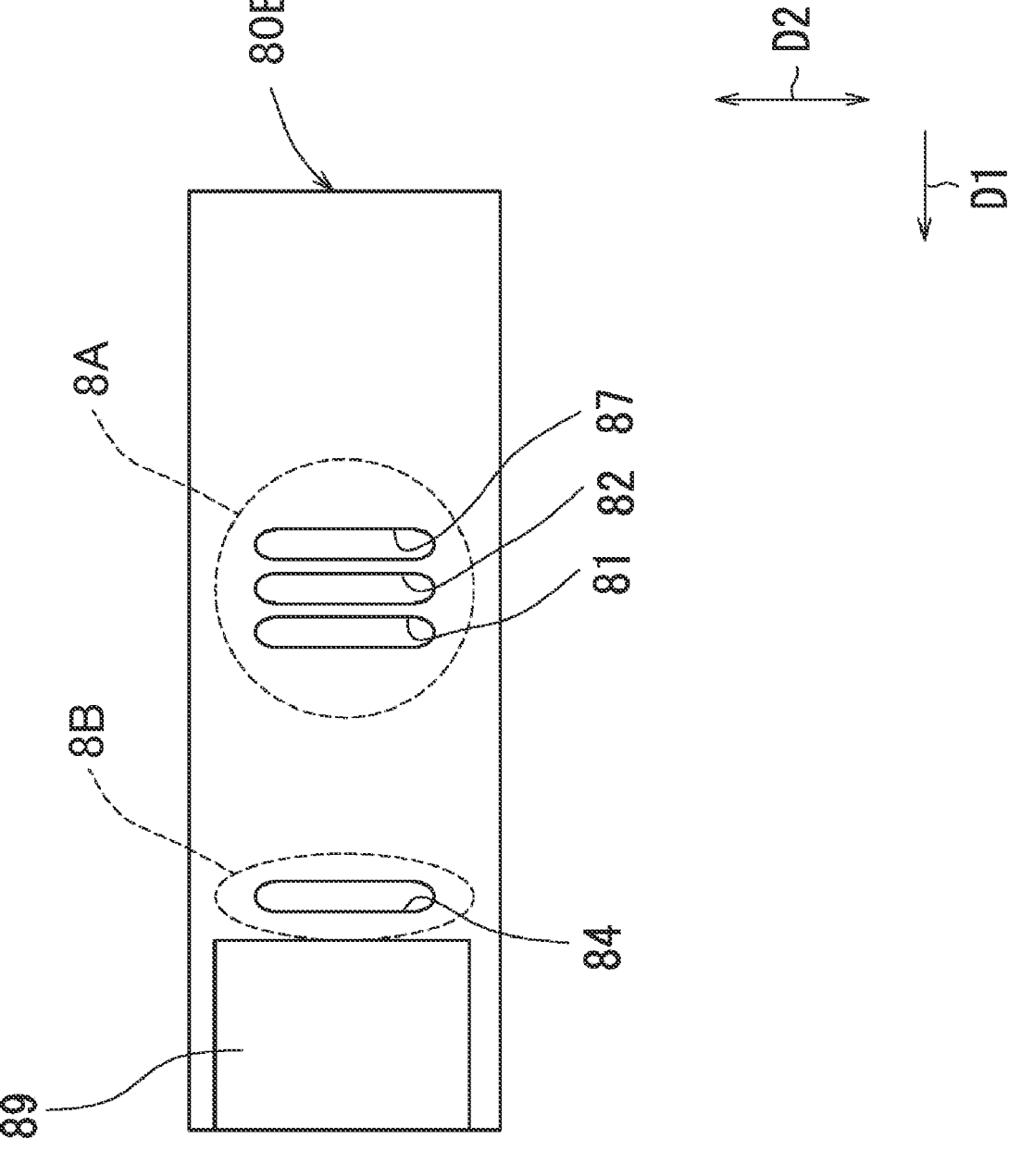
FIG. 9 is a plan view of a substrate according to variation of the disclosure.

(1) In the foregoing embodiments, the same number of holes are formed in the first fixing section 8A and the second fixing section 8B. However, the disclosure is not limited to such embodiments. In a substrate 80B according to a variation of the disclosure, as shown in FIG. 9, the number of holes formed in the first fixing section 8A and the number of holes formed in the second fixing section 8B are different. The substrate 80B includes the first fixing section 8A, the second fixing section 8B, and an electronic component 89. The electronic component 89 is, for example, a connector. The first fixing section 8A includes the first hole 81, the second hole 82, and the seventh hole 87. The second fixing section 8B includes the fourth hole 84. The substrate 80B also allows, as in the first embodiment, the motors different in pitch between the terminals to be fixed thereto. In addition, the electronic component 89 can be mounted on the substrate 80B.

(2) In the foregoing embodiment, three holes extending in the second direction D2 are formed in the first fixing section 8A, and three holes extending in the second direction D2 are also formed in the second fixing section 8B. However, the disclosure is not limited to such embodiments. For example, two holes, or four or more holes may be formed in either or both of the fixing section. Further, the number of holes formed in the first fixing section 8A and the number of holes formed in the second fixing section 8B may be different from each other.

(3) In the foregoing embodiments, the disclosure is applied to the image forming apparatus 100. However, the disclosure is not limited to such embodiments. The disclosure is applicable to any type of devices, provided that the device at least includes a substrate for fixing a DC motor.

INDUSTRIAL APPLICABILITY

The disclosure is advantageously applicable to the field of the substrate.

While the present disclosure has been described in detail with reference to the embodiments thereof, it would be apparent to those skilled in the art the various changes and modifications may be made therein within the scope defined by the appended claims.

What is claimed is:

1. A substrate comprising:

a first fixing section to which a first terminal of a pair of plate-shaped terminals protruding from a motor is fixed; and a second fixing section to which a second terminal of the pair of terminals is fixed,

wherein the first fixing section includes a first hole and a second hole, the first hole extends in a second direction, intersecting a first direction extending from the first terminal toward the second terminal, the second hole extends in the second direction, and is located adjacent to the first hole, on an opposite side of the second fixing section in the first direction, with respect to the first hole, and the first terminal is inserted through one of the first hole and the second hole, wherein the second fixing section includes a fourth hole extending in the second direction, wherein the second fixing section further includes a fifth hole extending in the second direction, and located adjacent to the fourth hole, on an opposite side of the first fixing section in the first direction, with respect to the fourth hole, wherein the first fixing section further includes a third hole extending in the first direction, the second fixing section further includes a sixth hole extending in the first direction, the third hole intersects the first hole and the second hole, the sixth hole intersects the fourth hole and the fifth hole, and the third hole and the sixth hole are colinear with each other.

* * * * *